(12) United States Patent
Tamai et al.

(10) Patent No.: US 7,888,895 B2
(45) Date of Patent: Feb. 15, 2011

(54) POWER SUPPLY SYSTEM FOR DRIVING ELECTRIC ROTATING MACHINE

(75) Inventors: Yasuhiro Tamai, Hino (JP); Akihiro Odaka, Hino (JP); Masakazu Gekinozu, Matsumoto (JP)

(73) Assignee: Fuji Electric Systems Co., Ltd. (JP)

( * ) Notice: Subject to any disclaimer, the term of this patent is extended or adjusted under 35 U.S.C. 154(b) by 428 days.

(21) Appl. No.: 12/033,667

(22) Filed: Feb. 19, 2008

(65) Prior Publication Data

US 2008/0211437 A1 Sep. 4, 2008

(30) Foreign Application Priority Data

Feb. 16, 2007 (JP) .............................. 2007-035942

(51) Int. Cl.
*H02P 3/00* (2006.01)
*H02P 5/00* (2006.01)

(52) U.S. Cl. ...................... 318/139; 318/140; 318/149; 318/150; 320/134; 320/162

(58) Field of Classification Search ................ 318/148, 318/441, 149, 150, 139, 250, 140; 701/22; 307/10.1; 180/65.1; 320/162, 134
See application file for complete search history.

(56) References Cited

U.S. PATENT DOCUMENTS

| | | | |
|---|---|---|---|
| 7,108,088 B2* | 9/2006 | Muta | 180/65.235 |
| 2005/0016781 A1* | 1/2005 | Muta | 180/65.2 |
| 2007/0171689 A1* | 7/2007 | Ishikawa et al. | 363/71 |
| 2007/0240922 A1* | 10/2007 | Kikuchi | 180/65.4 |
| 2008/0236912 A1* | 10/2008 | Ueoka et al. | 180/65.2 |
| 2009/0105043 A1* | 4/2009 | Muta et al. | 477/97 |

FOREIGN PATENT DOCUMENTS

| | | |
|---|---|---|
| JP | 2005-318731 A | 11/2005 |
| JP | 2006-340470 A | 12/2006 |
| WO | 2005-105511 A1 | 11/2005 |

OTHER PUBLICATIONS

Motor Control and Boost Coverter Control for Hybrid Vehicles; Toyota Technical Review; vol. No. 54, No. 1; pp. 42-51; 2005. English abstract provided.
Development of High Output Power Control Unit for Hybrid SUVs; Toyota Technical Review, vol. 54; No. 1; 2005. English abstract provided.

* cited by examiner

*Primary Examiner*—Paul Ip
(74) *Attorney, Agent, or Firm*—Rossi, Kimms & McDowell LLP

(57) ABSTRACT

An electric power supply system for driving an electric rotating machine has a generator supplied with driving power from an engine to generate alternating-current electric power and a matrix converter as an alternating-current to alternating-current direct converter supplied with the alternating-current electric power to output arbitrary alternating-current electric power. By driving a motor with the alternating-current electric power supplied from the matrix converter, only one time electric power conversion is carried out to provide high efficiency in the whole system. In addition, electric power loss can be reduced so as to enhance a motor output when the system is applied to a vehicle power supply system.

10 Claims, 5 Drawing Sheets

POWER SUPPLY SYSTEM FOR DRIVING ELECTRIC ROTATING MACHINE

CROSS-REFERENCE TO RELATED APPLICATION

This application claims priority from Japanese Patent Application 2007-035942 filed on Feb. 16, 2007 the content of which is incorporated herein by reference.

BACKGROUND

The present invention relates to a power supply system for driving an electric rotating machine, particularly to a power supply system for driving an electric rotating machine suited for vehicle use.

FIG. 10 is a schematic view showing a first example of the arrangement of a related power supply system for driving an electric rotating machine provided in a driving system of a hybrid vehicle. The power supply system is disclosed in the following non-patent document: H. Hanada et al., TOYOTA Technical Review Vol. 54, No. 1, August 2005, pp. 42-51.

The first example is presented as a power supply system in a driving system of a hybrid vehicle provided with both of an internal combustion engine and a motor as driving power sources of a vehicle. The driving system is made up of components such as an engine ENG, gears G, a driving power split mechanism PG, a generator MG1, a motor MG2, inverters INV1 and INV2, a battery voltage step-up converter CHP, a battery BT and wheels T.

In the power supply system shown in FIG. 10, three-phase alternating-current, generated by the generator MG1 driven by the engine ENG through the power split mechanism PG, is once converted to a direct-current by the inverter INV1. The inverter INV2 further converts the converted direct-current to a three-phase alternating-current with an arbitrary voltage and a frequency, which drives the motor MG2 to thereby drive the wheels. Moreover, electric power for driving the wheels T is also supplied from the battery BT. Thus, the battery voltage is stepped-up by the battery voltage step-up converter CHP.

With the above procedure, in addition to the electric power supply from the generator MG1, electric power can be supplied from the battery BT. This can reduce an electric capacity of each of components for the electric power supply to enable downsizing of the system. Furthermore, with the direct-current voltage, being stepped-up by the battery voltage step-up converter CHP, adjusted at a voltage with an arbitrary value, the whole electric energy transmitting section can be made highly efficient. In the following, the electric energy transmitting section will be simply referred to as the system.

FIG. 11 is a schematic view showing a second example of the arrangement of a related power supply system for driving an electric rotating machine. The power supply system is disclosed in JP-A-2005-318731 (corresponding international publication number: WO 2005/105511 A1) and JP-A-2006-340470. This is also an example of the power supply system provided in the driving system of a hybrid vehicle. The differences in the second example shown in FIG. 11 from the first example shown in FIG. 10 are that (1) the inverter INV1 in the first example is substituted by a matrix converter MC and (2) while the direct-current output section of the inverter INV 1 was connected to the voltage step-up section of the battery voltage step-up converter CHP in the first example of the related power supply system shown in FIG. 10, in the second example of the related power supply system shown in FIG. 11, the three-phase alternating-current output section of the matrix converter MC is connected in parallel to the three-phase alternating-current output of the INV 2. In this case, the electric power generated by the generator MG1 is directly supplied to the motor MG2 without the intervention of the inverter INV2.

The matrix converter is well-known as a circuit for directly converting a three-phase alternating current from a power supply to a three-phase alternating-current with an arbitrary voltage and frequency by operating bi-directional switches to carry out pulse width modulation (PWM). Thus, the explanation thereof will be omitted.

In the configuration of the power supply system shown in FIG. 10, the generator MG1, the motor MG2 and the battery BT are connected to one another with a main capacitor C with their voltages converted by the inverter INV1, the inverter INV2 and the battery voltage step-up converter CHP, respectively. The voltage applied to the main capacitor C is made variable according to the operating conditions of the generator MG1 and the motor MG2 to thereby reduce a system loss for enhancing the motor efficiency.

In the arrangement in the power supply system shown in FIG. 10, however, when the power generated by the generator MG1 is converted to the power supplied to the motor MG2, an electric current is fed to the two inverters INV1 and INV2 through such a path as that of the inverter INV1→the main capacitor C→the inverter INV2. This causes a problem of increasing losses produced in the inverters.

While in the arrangement in the power supply system shown in FIG. 11, for eliminating the drawback in the power supply system shown in FIG. 10 to improve the system, direct conversion of the electric power is carried out by the use of the matrix converter MC to reduce the losses produced in the inverters. Moreover, an output of the battery BT is converted to a three-phase alternating current with the inverter INV2 via the battery voltage step-up converter CHP. The three-phase alternating-current output of the INV2 is connected to the motor MG2 in parallel to the three-phase alternating-current output of the matrix converter MC.

Both of the matrix converter MC and the inverter INV2 function as three-phase alternating-current power supplies for the motor MG2. Therefore, when a slight potential difference is caused between the output of the matrix converter MC and the output of the inverter INV2, the output current of the matrix converter MC and the output current of the inverter INV2 becomes unbalanced. This makes it practically impossible to simultaneously use both of the matrix converter MC and the inverter INV2.

A countermeasure against this is to insert an impedance element such as a reactor between the output terminals of the matrix converter MC and the inverter INV2. This makes it possible to balance the output currents of the two. However, the matrix converter MC and the inverter INV2 are connected in parallel to each other and the matrix converter MC can not step-up the voltage generated by the generator MG1. This, as far as the electrical specifications of the motor MG2 and the battery BT are the same as those in the power supply system shown in FIG. 10, causes problems of making it impossible to raise the voltage for reducing the system loss and enhancing the motor output as was described about the system shown in FIG. 10.

Accordingly, it would be desirable to provide a system to reduce an electrical loss and to enhance a motor output even though a matrix converter is used in the system.

SUMMARY OF THE INVENTION

A power supply system for driving an electric rotating machine according to a first aspect of the invention is characterized by including a first electric rotating machine driven by driving power for generating first alternating-current electric power, and an alternating-current to alternating-current direct converting device converting the first alternating-current electric power to be outputted as second alternating-current electric power for driving a second electric rotating machine.

In the first aspect of the invention, an alternating-current power supply can be provided between the alternating-current to alternating-current direct converting device and the second electric rotating machine so as to be connected in series thereto (a second aspect of the invention). In the second aspect of the invention, the alternating-current power supply can be connected through a transformer (a third aspect of the invention).

In the third aspect of the invention, the alternating-current power supply can be made to include a battery and an inverter converting a direct-current voltage obtained from the battery into an alternating-current voltage (a fourth aspect of the invention). In the fourth aspect of the invention, a battery voltage step-up converter can be connected between the battery and the inverter (a fifth aspect of the invention). Furthermore, in the fourth or the fifth aspect of the invention, the alternating-current output terminals of the inverter and the main circuit terminals of the alternating-current to alternating-current direct converting device are connected through a first switch, the main circuit terminals being on the side being connected to the first rotating machine, and the transformer and the alternating-current output terminals of the inverter are connected through a second switch (a sixth aspect of the invention).

According to the invention, there can be achieved an advantage which enables the simultaneous realization of reduction in electrical loss when using a matrix converter and reduction in a system loss and enhancement of a motor output by raised voltage.

Namely, according to the first aspect of the invention, only one time power conversion is enough, which enables the whole system to have a high efficiency. Moreover, according to the second aspect of the invention, it becomes possible to apply a high voltage to the second electric rotating machine, which allows the transformer to be downsized even when the alternating-current voltage source is connected to the system through a transformer as the third aspect of the invention. Furthermore, according to the fourth aspect of the invention, an alternating-current power supply can be obtained which can output an alternating-current voltage with an arbitrary value, and according to the fifth aspect of the invention, the range of the voltage that can be applied to the second rotating machine is expanded. In addition, according to the sixth aspect of the invention, it becomes possible to exchange optimum power according to the operation.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS

Figure 1:
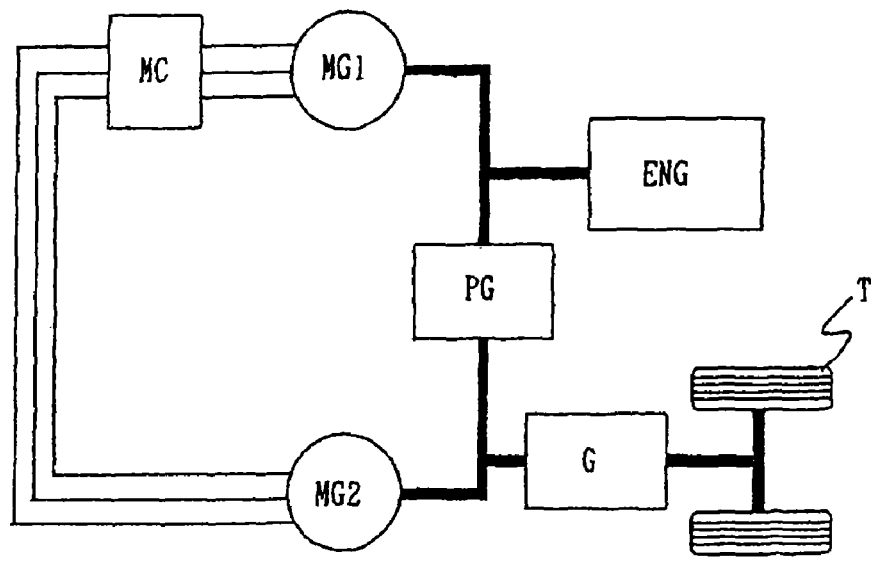
FIG. 1 is a schematic view showing an arrangement of an embodiment of a power supply system for driving an electric rotating machine according to the invention provided in a driving system of a hybrid vehicle.

FIG. 1 is a schematic view showing an arrangement of an embodiment of a power supply system for driving an electric rotating machine according to the invention provided in a driving system of a hybrid vehicle.

In a hybrid vehicle, a part of the energy generated by the rotation of an engine ENG is directly used for driving wheels T via a power split mechanism PG. The rest of the generated energy is used for rotating a generator MG1 to generate electric power. The alternating-current electric power generated by the generator MG1 is converted to a desired alternating-current electric power by an alternating-current to alternating-current direct converter MC to drive a motor MG2. For example, the alternating-current to alternating-current direct converter MC receives an instruction from a control circuit not shown to convert the frequency of the inputted alternating-current electric power, outputting the electric power with the converted frequency for driving the motor MG2. In addition to this, according to a speed instruction and a torque instruction, required for driving the motor MG2, from the control circuit, the magnitude of the inputted alternating-current electric power is also converted and outputted. The energy outputted from the motor MG2 and the energy directly given by the engine ENG, transmitted through the power split mechanism PG are combined by the gear G to drive the wheels T. At this time, by adequately adjusting the proportion of the energy supplied from the motor MG2, the efficiency in driving the wheels can be maximized.

Namely, the power supply system shown in FIG. 1 is characterized by the use of the alternating-current to alternating-current direct converter as an electric power converter for driving the motor MG2. The alternating-current to alternating-current direct converter is a converter that can output an arbitrary alternating-current voltage from an inputted alternating-current voltage. The matrix converter MC is just one example of such a converter. In the following description, explanations will be made with examples each using a matrix converter MC. However, other kinds of alternating-current to alternating-current direct converters can be utilized to obtain similar advantages.

As another arrangement of the electric power converter for driving the motor MG2, one with a system is possibly provided in which an alternating-current electric power from the generator MG1 is once converted to a direct-current electric power by a device such as a rectifier and the direct-current electric power is converted again by an inverter for obtaining an alternating-current electric power for driving the motor MG2. This, however, carries out two time electric power conversion to cause losses that lower the efficiency of the power supply system. Thus, with the use of the matrix converter as is provided in the invention, a power conversion carried out only once is enough to enable the system to be made highly efficient.

Figure 2:
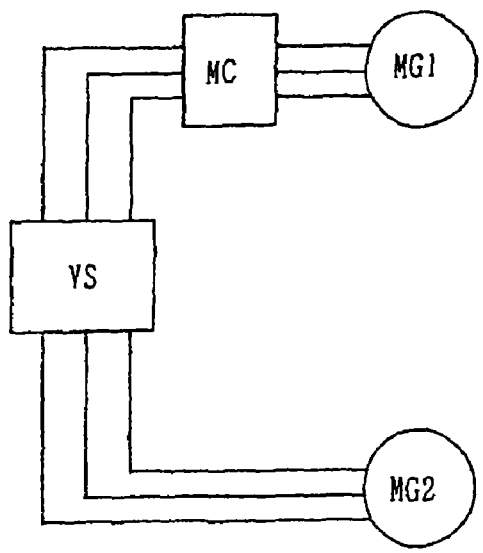
FIG. 2 is a schematic view showing an example of a modification of the power supply system shown in FIG. 1.

FIG. 2 is a schematic view showing an example of a modification of the power supply system shown in FIG. 1. While the system illustrated in FIG. 1 uses the output of the matrix converter MC as the sole source of power to drive the motor MG2, a hybrid vehicle usually utilizes a second source of power. The second source of power is characterized in the system shown in FIG. 2 in the provision of an alternating-current power supply VS inserted in series between the matrix converter MC and the motor MG2. A hybrid vehicle, for example, ordinarily has a built-in battery and it is assumed that the direct-current electric power of the battery is converted to alternating-current electric power for providing the arrangement of the alternating-current power supply VS. In the arrangement, two alternating-current power supplies, an alternating-current power supply in which the output of the generator MG1 is converted by the matrix converter MC and the alternating-current power supply VS, are connected in series. This enables simultaneous operation with the matrix converter MC and the alternating-current power supply VS. Furthermore, by superposing the voltage of the alternating-current power supply VS on the output voltage of the matrix converter MC, the applied voltage to the motor MG2 can be made higher compared with the voltage when it is applied from either one of the two alternating-current power supplies. High voltage drive of the motor MG2 enables reduction of losses in the driving system with the motor MG2.

In the related art, the arrangement with the alternating-current power supply and the matrix converter connected in parallel makes a simultaneous operation of the two practically difficult to necessitate either one to always independently supply electric power to the motor. For example, at an abrupt acceleration such as that at a hill start that requires the maximum amount of energy, no electric power can be sufficiently supplied to the motor in the related power supply system. In the invention, however, the arrangement with the matrix converter MC and the alternating-current power supply VS connected in series enables easy realization of a simultaneous operation of the two to allow electric power to be supplied from the two to the motor MG2. As a result, the capacity of the matrix converter MC can be reduced to the minimum possible. While, at an ordinary driving, it is necessary only that, with the operation of the alternating-current power supply VS made stopped, the matrix converter MC independently supplies electric power to the motor MG2.

The maximum output voltage of the matrix converter MC is 0.866 times the input voltage, which causes a limitation to the range of the output voltage. Nevertheless, for maximizing the efficiency of the whole system, a high voltage driving of the motor MG2 is sometimes required. With the related arrangement, however, the applied voltage to the motor MG2 is limited by the maximum output voltage of the matrix converter MC. Compared with this, in the invention, series connection of the alternating-current power supply VS to the matrix converter MC allows the alternating-current voltage applied to the motor MG2 to be increased by carrying out control so as to make the phase of the output voltage of the matrix converter MC coincide with that of the alternating-current power supply VS.

Thus, by the control of the alternating-current power supply VS, the output voltage of the matrix converter MC can be equivalently increased to make it possible to solve the problem in the related art. Moreover, there is no additional component other than the alternating-current power supply VS, so that the system can be downsized.

Figure 3:
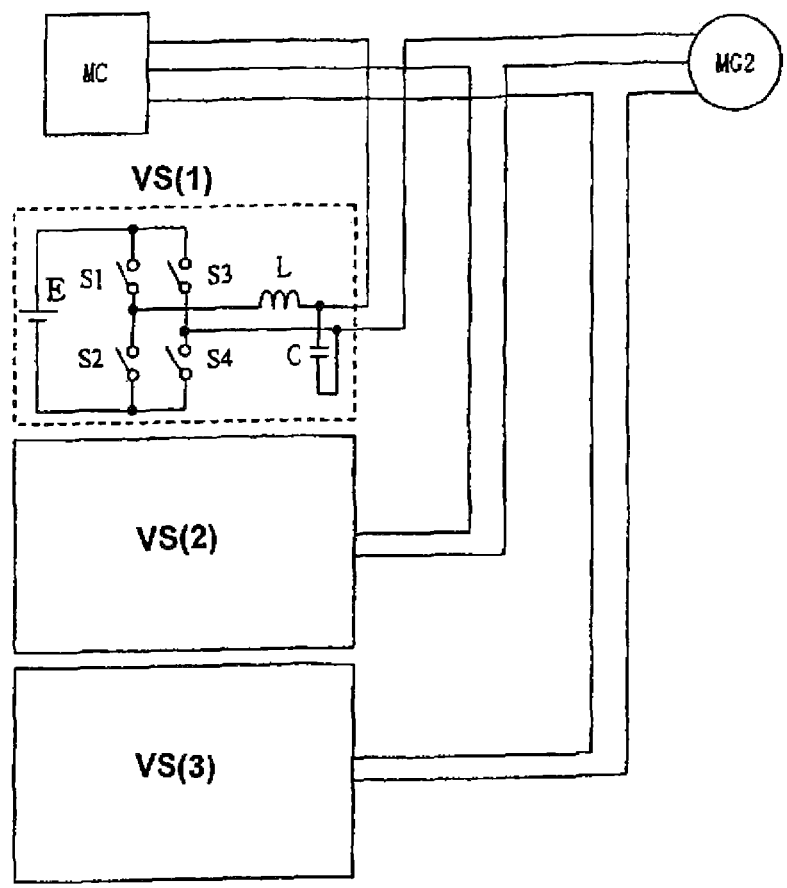
FIG. 3 is a diagram showing an example of the specific circuit configuration of the alternating-current power supply VS shown in FIG. 2.

FIG. 3 is a diagram showing an example of the specific circuit configuration of the alternating-current power supply VS shown in FIG. 2. In FIG. 3, S1 to S4 designate switching devices connected as the arms of a bridge circuit with each end of the series connection of the switching devices S1 and S2 and each end of the series connection of the switching devices S3 and S4 connected to a direct-current power supply E. This forms a single-phase inverter that outputs alternating-current electric power from the series connection point of the switching devices S1 and S2 and the series connection point of the switching devices S3 and S4. The series connection point of the switching devices S1 and S2 is connected to the matrix converter MC and the series connection point of the switching devices S3 and S4 is connected to the motor MG2. Moreover, a reactor L and a capacitor C form a filter. With the above arrangement made as that for one phase VS(1), similar arrangement is made for each of the other two phases VS(2), VS(3) of the three-phases provided.

With the alternating-current power supply thus formed, the output of the matrix converter MC is connected to the motor MG2 with the output of the single-phase inverter as the alternating-current power supply VS connected in series to the output in each phase of the matrix converter MC.

When no electric power is supplied from the alternating-current power supply VS, by making the switching devices S1 and S3 always turned-on, for example, the matrix converter MC alone can drive the motor MG2. However, despite no supply of electric power from the alternating-current power supply VS to the motor MG2, currents always flow in the switching devices S1 and S3 to produce conduction loss, which is to lower efficiency.

Figure 4:
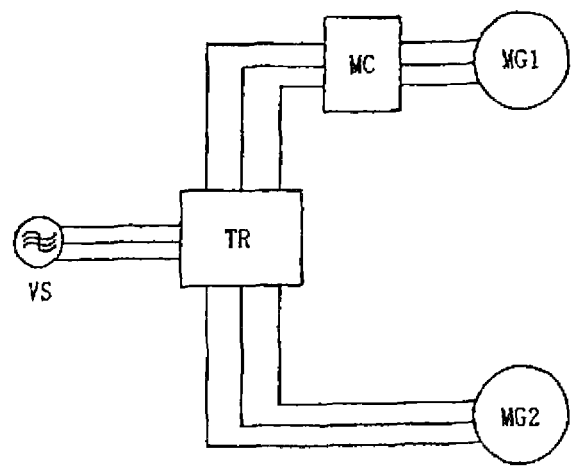
FIG. 4 is a schematic view showing an arrangement of another embodiment of the power supply system for driving an electric rotating machine according to the invention.

FIG. 4 is a schematic view showing an arrangement of another embodiment of the power supply system for driving an electric rotating machine according to the invention. This is a system in which the alternating-current power supply VS is inserted in series between the matrix converter MC and the motor MG2 through a transformer TR. In the system, the loss produced in the system shown in FIGS. 2 and 3 can be reduced. As shown in FIGS. 2 and 3, direct connection of the alternating-current power supply VS without using the transformer TR causes currents to flow always in the switching devices forming the alternating-current power supply VS. Thus, the loss due to the currents becomes a problem.

Compared with this, the use of the transformer TR as shown in FIG. 4 allows currents to flow in the switching devices only when electric power is supplied from the alternating-current power supply VS. This makes it possible to reduce the loss in the alternating-current power supply VS. The alternating-current power supply VS is an auxiliary power supply that is operated only when a large amount of energy is required. Thus, its capacity to that of the matrix converter MC is small to allow the transformer TR to be a small one. Therefore, an increase in the volume of the system due to the insertion of the transformer TR can be kept to a minimum.

Figure 5:
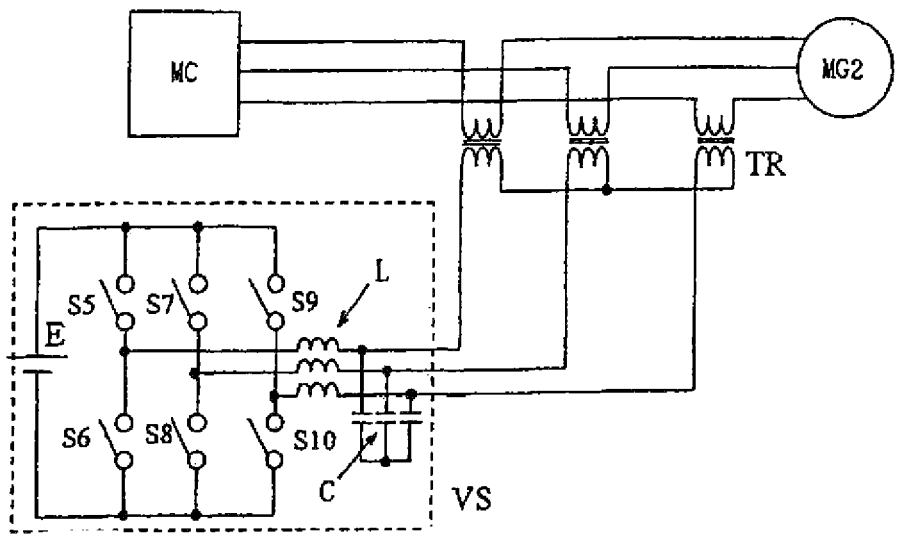
FIG. 5 is a diagram showing a first example of the specific circuit configuration of the alternating-current power supply VS shown in FIG. 4.

FIG. 5 is a diagram showing a first example of the specific circuit configuration of the alternating-current power supply VS shown in FIG. 4. In FIG. 5, S5 to S10 designate switching devices connected as the arms of a bridge circuit with each of the pairs of the switching devices S5 and S6, S7 and S8, and S9 and S10 connected in series. Both ends of each series connection of the switching devices are connected to a direct-current power supply E. This forms a three-phase inverter that outputs alternating-current electric power from the series connection point of the switching devices S5 and S6, the series connection point of the switching devices S7 and S8, and the series connection point of the switching devices S9 and S10.

The output for each of the three phases of the matrix converter MC is connected to one end of the primary winding for the corresponding phase of the transformer TR, the other end of which winding is connected to the input for the corresponding phase of the motor MG2. While, the series connection point of the switching devices S5 and S6 is connected to one end of a secondary winding of the transformer TR for the phase corresponding to that at the connection point. Similarly, each of the series connection point of the switching devices S7 and S8 and the series connection point of the switching devices S9 and S10 is also connected to one end of the secondary winding of the transformer TR of the phase corresponding to that at the connection point. The other ends of the respective secondary windings of the transformer TR are connected to one another. Moreover, reactors L and capacitors C form filters.

With the alternating-current power supply VS thus formed, the output of the matrix converter MC is connected to the motor MG2 with the output of the inverter as the alternating-current power supply VS connected in series to the output of the matrix converter MC.

Figure 6:
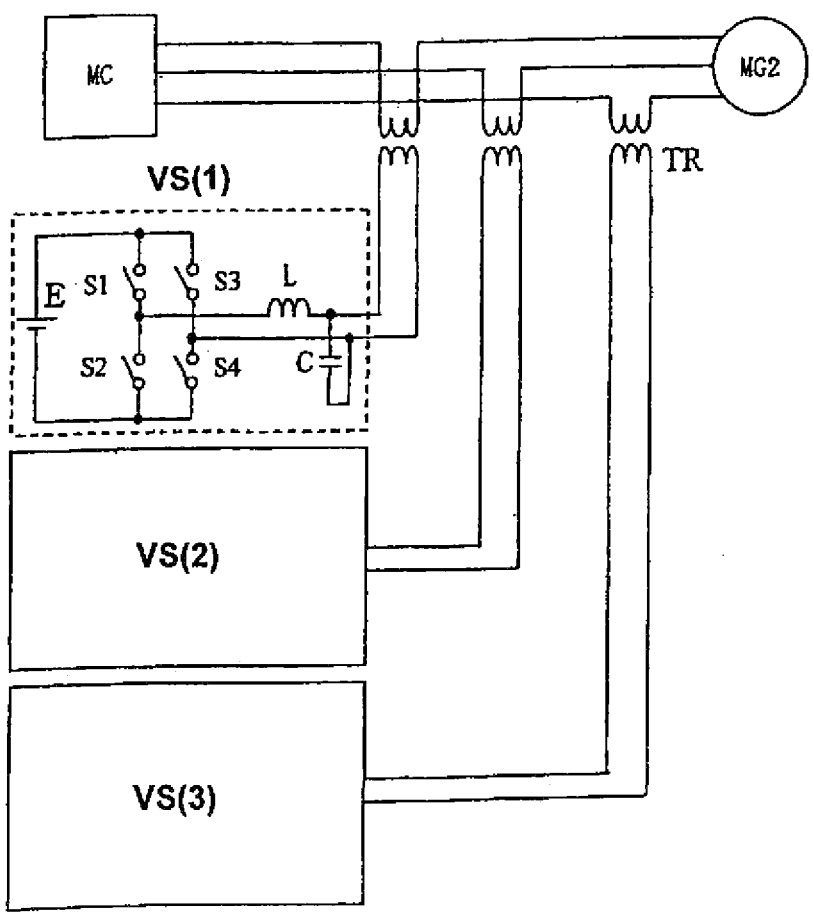
FIG. 6 is a diagram showing a second example of the specific circuit configuration of the alternating-current power supply VS shown in FIG. 4.

FIG. 6 is a diagram showing a second example of the specific circuit configuration of the alternating-current power supply VS shown in FIG. 4. In the configuration shown in FIG. 6, a single-phase inverter as that shown in FIG. 3 is provided as an alternating-current power supply VS, the output of which is connected in series to the output in each phase of the matrix converter MC through a transformer TR.

For the transformer TR, three single-phase are used. One end of the primary winding of the single-phase transformer for each of the three phases is connected to the output for the corresponding phase of the matrix converter MC. The other end of the primary winding of each of the single-phase transformers is connected to the input for the corresponding phase of the motor MG2. To the secondary winding of each of the single-phase transformers, a single-phase inverter as an alternating-current power supply VS is connected.

Namely, with the circuit configurations as shown in FIGS. 5 and 6, when the motor MG2 is driven by the matrix converter MC alone, it is necessary only that all of the switching devices S5 to S10 or S1 to S4 are made always turned-off. Therefore, no loss is caused in the alternating-current power supply VS.

Figure 7:
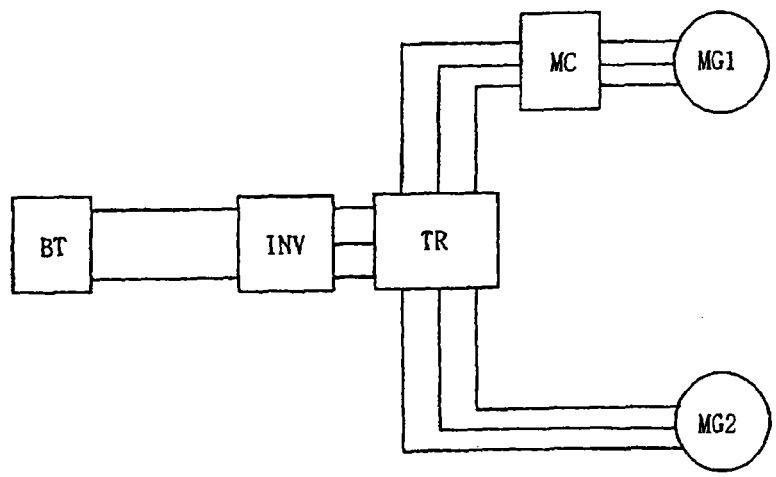
FIG. 7 is a schematic view showing an example of the modification of the embodiment of the power supply system shown in FIG. 4.

FIG. 7 is a schematic view showing an example of the modification of the embodiment of the power supply system shown in FIG. 4. In the example, instead of the alternating-current power supply VS used in the system shown in FIG. 4, a battery BT and an inverter INV are used. Namely, the system enables the direct-current electric power stored in the battery BT, ordinarily contained in a hybrid vehicle, to be outputted as alternating-current electric power with the use of the inverter INV. In this case, for expanding the range of the output voltage of the inverter INV to obtain a high voltage, ordinarily the number of turns in the winding of the transformer TR must be adjusted. This, however, is not preferable from the view point of loss reduction and downsizing of the transformer TR. Thus, for obtaining a high voltage, a battery voltage step-up converter CHP is desirably used as shown in the following example.

Figure 8:
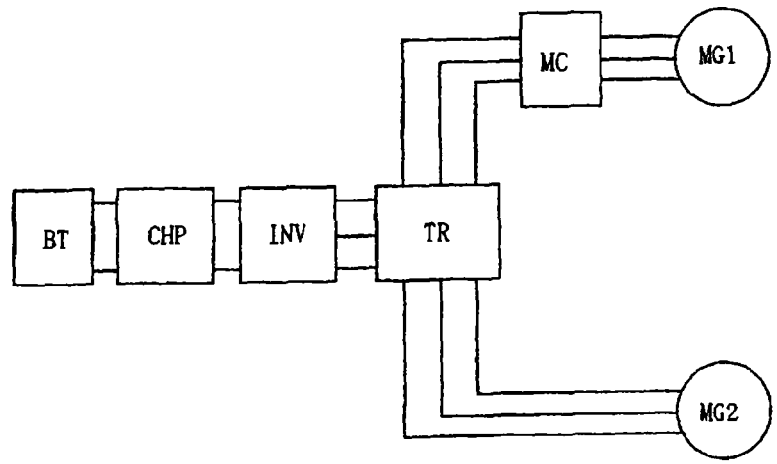
FIG. 8 is a schematic view showing an arrangement of further another embodiment of the power supply system for driving an electric rotating machine according to the invention.

FIG. 8 is a schematic view showing an arrangement of further another embodiment of the power supply system for driving an electric rotating machine according to the invention. This is a system having an arrangement in which a battery voltage step-up converter CHP is connected between the battery BT and the inverter INV. By stepping-up the voltage of the battery BT with the battery voltage step-up converter CHP, the output voltage of the inverter INV is to be made enhanced. As a result, the range of the voltage that can be applied to the motor MG2 is expanded to make it possible to improve the efficiency of the whole system.

Figure 9:
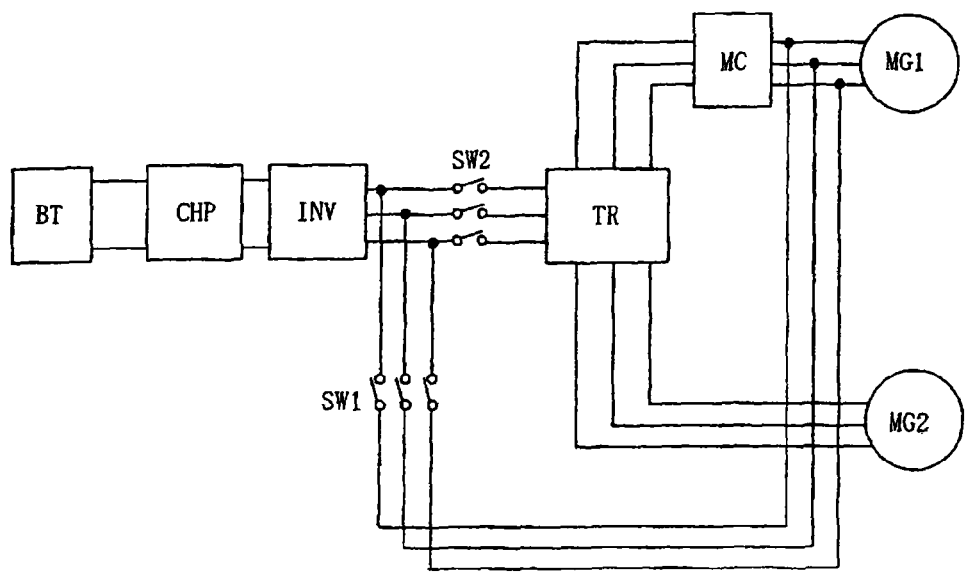
FIG. 9 is a schematic view showing an example of a modification of the power supply system shown in FIG. 8.
Figure 10:
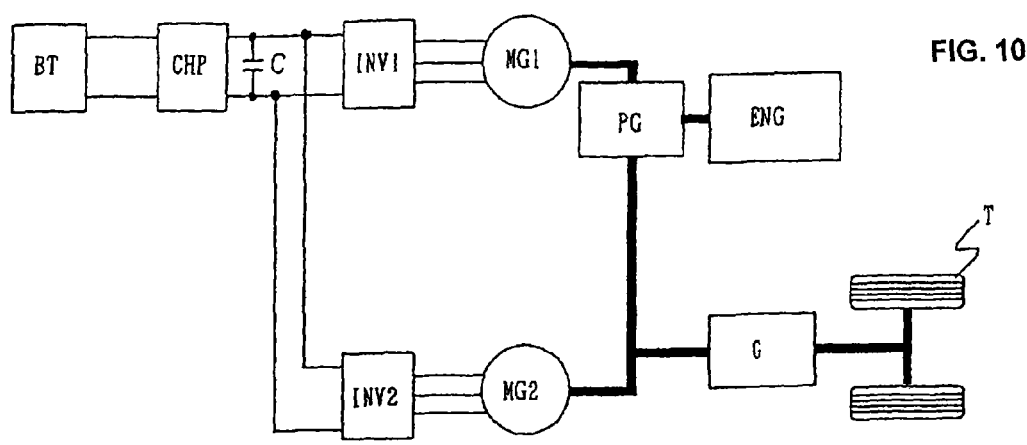
FIG. 10 is a schematic view showing a first example of the arrangement of a related power supply system for driving an electric rotating machine provided in a driving system of a hybrid vehicle.
Figure 11:
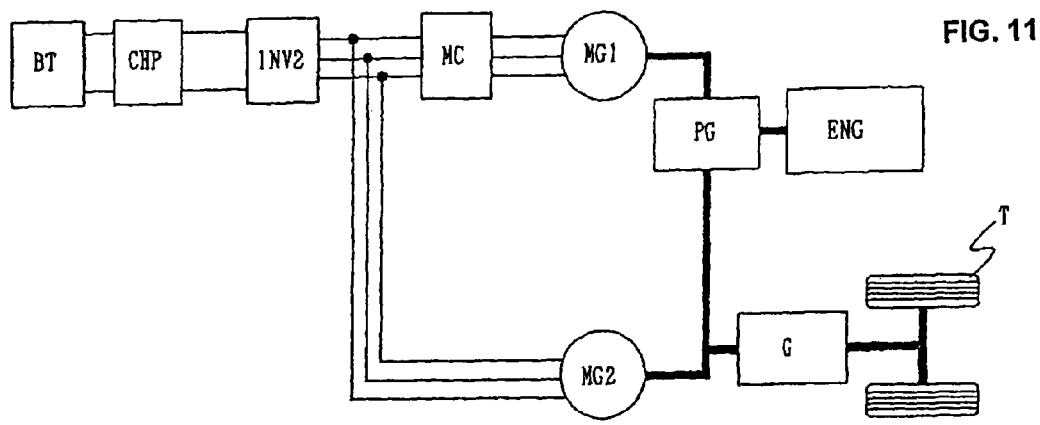
FIG. 11 is a schematic view showing a second example of the arrangement of a related power supply system for driving an electric rotating machine provided in a driving system of a hybrid vehicle.

FIG. 9 is a schematic view showing an example of a modification of the power supply system shown in FIG. 8. As shown in FIG. 9, the example of the modification is characterized in that, in addition to the configuration shown in FIG. 8, the alternating-current output terminals of the inverter INV and the main circuit terminals of the matrix converter MC on the side of being connected to the generator MG1 are further connected through a switch SW1 and the alternating-current output terminals of the inverter INV and the transformer TR are connected through a switch SW2. The states of turning on and off of the switches are controlled depending on the driving condition of a vehicle as shown in TABLE 1. As a result, optimum electric power exchanges for the driving condition become possible among the generator MG1, the motor MG2 and the battery BT.

TABLE 1

Example of control method of switches SW1 and SW2

|  | Switch SW1 | Switch SW2 | Matrix converter MC |
|---|---|---|---|
| At system starting up | On | Off | Stopped |
| At deceleration | On | Off | Operated |
|  | Off | On | Operated |
| At ordinary running | Off | On | Operated |

When starting up the system, the starting up is ordinarily carried out by supplying electric power to the generator MG1 also operated as a motor to drive the engine. In this case, by making the switch SW1 turned-on and the switch SW2 turned-off to stop the operation of the matrix converter MC, a path is provided for connecting the battery BT and the generator MG1 to enable electric power to be supplied as driving power for driving the engine.

In the operation mode, when an amount of accumulation of electricity in the battery BT is lowered, the generator MG1 is driven by the driving power of the engine to supply electric power. This also enables the battery BT to be charged. The switch SW2 is for disconnecting the inverter INV from the motor MG2, and is made turned-off whenever exchange of energy is carried out between the generator MG1 and the battery BT.

At ordinary running, as shown in TABLE 1, the switch SW1 is made turned-off and the switch SW2 is made turned-on. When decelerating the vehicle during the ordinary running, the battery BT can be charged with regenerated energy from the motor MG2. For charging the battery BT, even when the switch SW1 is made turned-off, the inverter INV is controlled with the switch SW2 being made turned-on, by which the battery BT can be charged. In this mode, however, the charging is limited by the capacity of the transformer TR to impose an upper limit to the amount of energy that can be regenerated.

Thus, in the power supply system shown in FIG. 9, by making the switch SW1 turned-on and the switch SW2 turned-off, the regenerated energy from the motor MG2 is allowed so as to be transmitted to the battery BT. In this case, no transformer TR is included in the path of the regenerated energy. Therefore, no limitation is imposed by the transformer TR on the amount of the regenerated energy. This enables a larger amount of regenerated energy to be transmitted to the battery BT. At ordinary running, the switch SW1 may be always made turned-off and the switch SW2 may be always made turned-on.

In the power supply system shown in FIG. 9, the switches SW1 and SW2 are used, which can be used in the power supply system shown in FIG. 7 in the same way as that in the power supply system shown in FIG. 9.

While the present invention has been particularly shown and described with reference to preferred embodiments thereof, it will be understood by those skilled in the art that the foregoing and other changes in form and details can be made therein without departing from the spirit and scope of the present invention.

What is claimed is:

1. A power supply system for driving an electric rotating machine comprising:
    a first electric rotating machine that generates a first alternating-current electric power;
    an alternating-current to alternating-current direct converting device coupled to the first electric rotating machine;
    a second electric rotating machine coupled to the alternating-current to alternating-current direct converting device; and
    wherein the alternating-current to alternating-current direct converting device converts the first alternating-current electric power to a second alternating-current electric power that is a sole source of power that drives the second electric rotating machine.

2. A power supply system for driving an electric rotating machine comprising:
    a first electric rotating machine that generates a first alternating-current electric power;
    an alternating-current to alternating-current direct converting device coupled to the first electric rotating machine;
    a second electric rotating machine coupled to the alternating-current to alternating-current direct converting device; and
    an alternating-current power supply connected in series between the alternating-current to alternating-current direct converting device and the second electric rotating machine.

3. The power supply system for driving an electric rotating machine as claimed in claim 2 wherein the alternating-current power supply is connected through a transformer.

4. The power supply system for driving an electric rotating machine as claimed in claim 3 wherein the alternating-current power supply comprises:
    a battery; and
    an inverter that converts a direct-current voltage obtained from the battery into an alternating-current voltage.

5. The power supply system for driving an electric rotating machine as claimed in claim 4 wherein a battery voltage step-up converter is connected between the battery and the inverter.

6. The power supply system for driving an electric rotating machine as claimed in claim 4 wherein alternating-current output terminals of the inverter and main circuit terminals of the alternating-current to alternating-current direct converting device are connected through and the transformer and the alternating-current output terminals of the inverter are connected through a second switch.

7. The power supply system for driving an electric rotating machine as claimed in claim 5 wherein alternating-current output terminals of the inverter and main circuit terminals of the alternating-current to alternating-current direct converting device are connected through and the transformer and the alternating-current output terminals of the inverter are connected through a second switch.

8. The power supply system for driving an electric rotating machine as claimed in claim 2 wherein the alternating-current to alternating-current direct converting device comprises a matrix converter.

9. The power supply system for driving an electric rotating machine as claimed in claim 2, wherein the alternating-current power supply comprises a three-phase power supply including a direct current power source coupled to a single phase inverter for each phase.

10. The power supply system for driving an electric rotating machine as claimed in claim 2, wherein the alternating-current power supply comprises a direct current power supply coupled to a three-phase inverter.

* * * * *